United States Patent

[11] 3,624,783

[72] Inventor Nuke Ming Chang
　　　　　　　San Francisco, Calif.
[21] Appl. No. 45,719
[22] Filed June 12, 1970
[45] Patented Nov. 30, 1971
[73] Assignee Santa Fe International Corporation
　　　　　　　Los Angeles, Calif.

[54] MOTION CONTROL SYSTEM
　　　20 Claims, 7 Drawing Figs.
[52] U.S. Cl. .................................................. 214/16 R,
　　　　　　　　　　　　　　　　　　　　　　　254/172
[51] Int. Cl. .................................................. B65g 47/00
[50] Field of Search .................................... 254/172,
　　　　　　　　　　　　　　　　　173, 186; 214/13, 14

[56] References Cited
　　　　　　UNITED STATES PATENTS
3,189,195　6/1965　Fox, Jr. et al. ................ 214/14

3,469,821　9/1969　Gross et al. ...................... 254/173
*Primary Examiner*—Evon C. Blunk
*Assistant Examiner*—Hadd S. Lane
*Attorney*—Le Blanc & Shur

ABSTRACT: Disclosed is an open loop control for maintaining constant tension in a cable connecting two bodies. Among the applications of the system are transfer of a load between a pier and a vessel or between two vessels, maintaining constant tension in a cable between two vessels, barge towing, underwater pipelaying, etc. The system includes a motion sensor, and a motion-compensator subsystem to generate a control signal in synchronism with the motion being sensed but at a fixed phase offset in relation thereto. The control signal operates a motor or the like at a fixed speed forward or reverse to compensate for the sensed motion with the phase offset compensating for the reversal time lag between full speed in opposite directions present in the motor system.

INVENTOR
N. MING CHANG

BY Le Blanc & Shur
ATTORNEYS

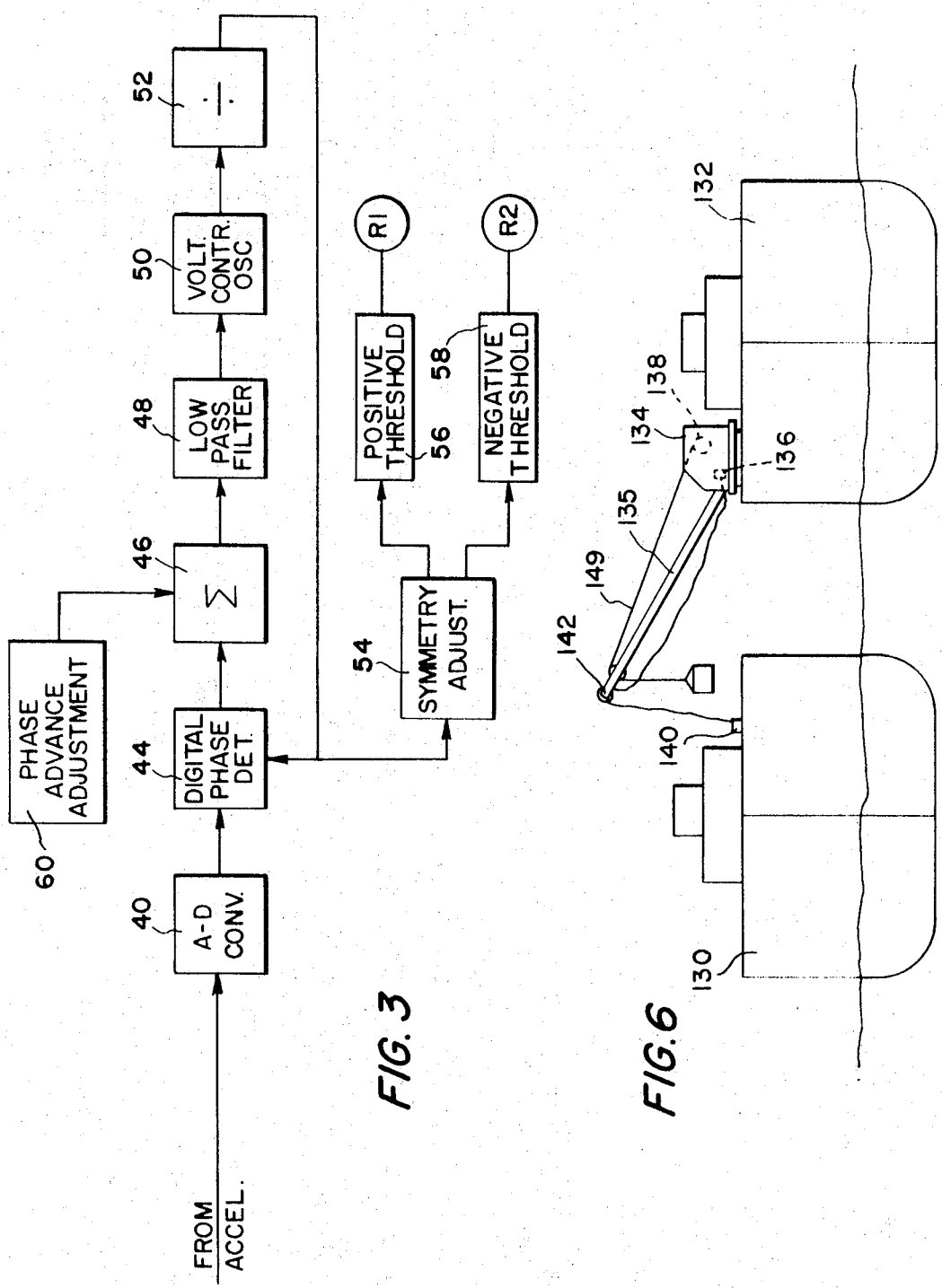

MOTION CONTROL SYSTEM

The present invention relates to apparatus for eliminating the effects of relative motion between two bodies, and more generally, to apparatus for controlling the tension in a cable or line between such bodies. A typical application of the present invention is in the transfer of loads between two platforms such as a ship and a pier or between two ships. Another application would be in maintaining constant tension in a cable or the like connecting two bodies or platforms in motion relative to each other.

Many marine operations are hindered by the effects of motion. For example, underwater applications such as pipelaying, drilling, and other sea-bottom activities are complicated by the fact that the operations involved are controlled from surface vessels which are subject to wave and/or tide forces. The resulting relative motion must be eliminated or at least compensated for if tasks are to be accomplished efficiently and accurately.

Many marine operations involve load transfer or support by a tensioned cable. Conventionally, such operations require the use of a motor-driven winch operating a derrick or other lifting mechanism. Thus, where tide or wave conditions produce substantial relative motion, considerable operator skill may be necessary to avoid damage to the load due to collision with one of the platforms or simply to maintain the desired constant cable tension.

Consider, for example, a load-transfer operation between a pier and a vessel tied alongside. As will be appreciated, the crane operator must coordinate the movement of the load with the up and down motion of the vessel to avoid damaging collision. Where the operation requires maintaining constant cable tension, it is seldom possible to employ manual control with any degree of accuracy. The difficulties in such operations are compounded when two moving vessels are involved and the motion of both must be taken into account.

The foregoing problems are well known, and numerous solutions have been proposed. Thus, devices are available which sense the relative motion between two platforms, and compensate automatically for such motion during hoisting or lowering operations, etc. Such devices involve various combination of electrical, electromechanical and hydraulic mechanisms, employing conventional feedback control, but generally, the mechanical parameters of the system impose unacceptable limits on the minimum system response time, i.e. on the rapidity with which the system can respond to and compensate for the relative motion being encountered. Under certain circumstances, e.g., large amplitude or relatively high-frequency wave motion, currently available devices may not respond rapidly enough.

Further, available device are somewhat inefficient and/or complicated, and frequently are not adaptable for use in existing installations without extensive modification.

The present invention is directed to apparatus which overcomes the above-noted difficulties. According to this invention, there is provided a combined electronic and electromechanical control system capable of extremely rapid and controllable response. The system is so designed that it may be constructed in modular form so that certain subsystems may be utilized with existing crane control or cable-tensioning systems. This facilitates upgrading of existing installations in a flexible and convenient manner.

More particularly, the system of this invention includes means for sensing the relative motion between the two bodies (hereinafter denoted as platforms), a digital motion-compensator subsystem including an analog to digital converter, digital motion compensation means, and a control subsystem for actuating the operating motor of a crane or other required mechanism.

The motion-compensator subsystem operates to eliminate the time delays inherent in electromechanical systems. Relying on the essentially repetitive character of wave action, a binary pulse train is generated having one value, e.g. ONE, when the acceleration of the relative motion is positive (e.g. upward) and the other value, i.e. ZERO, when the net relative acceleration is negative (i.e. downward). The pulse train is then processed by advancing its phase in relation to the phase of the input excitation and the new signal is used to drive the contactor control subsystem. As a result, the operation of the motor is reversed before the motion to be compensated for changes in direction so that the "transient response" of the system is completed, and the system is back in steady state operation (in the other direction) when the motion direction changes.

Where only one of the platforms is in motion, a single sensor is provided. Where both platforms are in motion, as in the case of load transfer between two vessels, separate sensors are provided on each platform and the net relative motion as determined by the two sensors provides the control input.

The above-described system has been found to be quite simple and effective and allows maintenance of the desired cable tension (and/or load position) irrespective of the relative motion of the platforms. Further, the motion-compensator subsystem may be employed with existing manually controlled cranes or winches simply by adding suitable relays or other control elements allowing automatic motor operation at a fixed speed in either direction according to the ONE and ZERO values of the compensator subsystem output.

Accordingly, it is an object of this invention to provide an improved motion control system.

It is another object of this invention to provide a motion control system for hoisting or cable-tensioning apparatus used in conjunction with two platforms in relative motion with respect to each other.

It is a further object of this invention to provide a motion-control system having a motion sensor, a motion-compensator subsystem, and a control subsystem for a motor to be driven.

It is a related object of this invention to provide a motion-control system in which the motion-compensator subsystem is adaptable for use with motor-control units in existing installations.

It is a further object of this invention to provide a motion-control system having a compensator subsystem which generates a signal having a predetermined phase advance in relation to the relative motion being controlled.

It is a related object of this invention to provide such a motion-control system which provides extremely rapid response to the relative motion being controlled.

Another related object of this invention is to provide such a motion-control system in which the motion-compensator subsystem is adjustable to meet varying characteristics of different lifting mechanisms and controllers with which it is to be used.

It is yet a further object of this invention to provide a motion-compensator system in which the drive motor is operated at a single speed, forward and reverse, in accordance with the sense of the net relative motion encountered, and in a predetermined advanced phase relation to said motion.

The exact nature of this invention, as well as other objects and advantages thereof will become apparent from the following detailed description and the accompanying drawing, in which:

FIG. 3 shows a block diagram of a motion-compensator subsystem for the system of FIG. 2;

FIG. 6 shows an illustrative representation of a second application of the present invention in load transfer between two relatively moving vessels.

Figure 1:
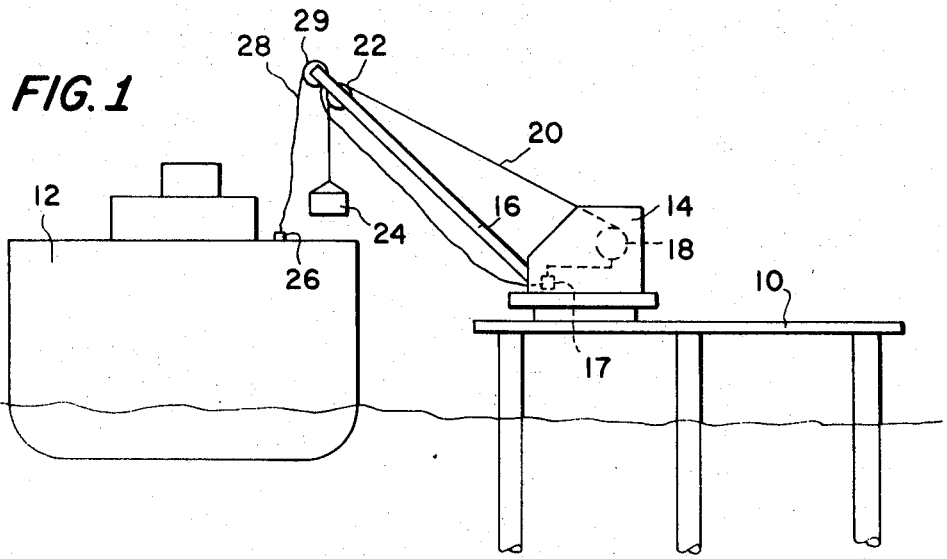
FIG. 1 shows an illustrative representation of application of the present invention in the transfer of a load between a vessel and a pier.

Referring first to FIG. 1, there is shown a dock or pier 10 and a vessel 12. Located on the pier is a crane or other lifting device 14 constructed in any conventional or desired fashion including a boom 16, control apparatus 17, and a motor-driven winch 18. A hoisting cable 20 carried by winch 18 is supported by a sheave 22. A load 24 attached to cable 20 by a suitable hook is suspended above the deck of vessel 12.

For the load-transfer application illustrated, the objectionable relative motion is the net vertical motion, including heave and the vertical components of pitch and roll. This is preferably measured by an accelerometer 26 shown mounted on the deck of vessel 12, with its sensitive axis perpendicular to the deck surface. Accelerometer 26 is connected to control apparatus 17 by a flexible electric cable 28. The latter may be supported in any suitable fashion, as by a sheave 29 at the end of boom 16. A small motor-operated winch (not shown) or even a hand-operated winch may be provided to take and pay out cable 28.

The various aspects of the arrangement illustrated in FIG. 1 are intended solely to be representative of one application of the present invention. Thus, it should be understood that other lifting mechanisms may be employed instead. Likewise, it should be appreciated that the lifting mechanism may be located on vessel 12 rather than on the pier, in which case motion sensor 26 may be mounted directly on boom 16. Alternatively, for a vessel mounted crane, the motion sensor 26 may be a load cell incorporated in cable 20.

Figure 2:
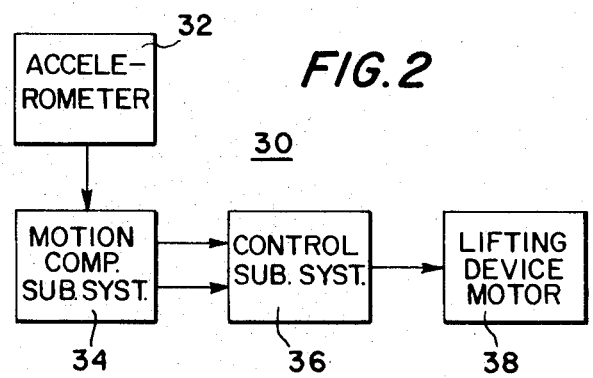
FIG. 2 shows a block diagram of a load motion-control system for use in the application of FIG. 1.

Turning now to FIG. 2, there is illustrated at 30 in simplified block diagram form the components comprising the motion-control system of this invention. The system includes an accelerometer 32, a motion-compensating subsystem 34, a control subsystem 36, and a lifting device motor 38.

As will be noted, overall system feedback is not provided, thus the motion of the load itself does not affect system operation (except, of course, to the extent that the load may be supported by a crane mounted on a moving vessel rather than on a fixed pier). For this and other reasons, it is preferred that an accelerometer be employed as the motion sensor. However, it should be understood that velocity or position sensors may alternatively be employed. As a further alternative, velocity or position signals may be generated and differentiated so that the input to motion compensation subsystem 34 is an acceleration signal.

In general terms, system 30 operates by processing the acceleration input signal to convert the same into a binary pulse train having the value ONE when the accelerator output is positive and a ZERO value when the accelerometer output is negative (or vice versa if desired). The resulting pulse train, is further processed to produce a modified pulse train having a fixed phase offset to compensate for inertia, damping, and other dynamic characteristics of control subsystem 36, motor 38, and whatever load is being handled. An important feature of this invention is that the phase offset is adjustable to conform to the operating characteristics of any control unit 36 and lifting device motor 38 whereby motion compensator subsystem 34 may be employed in existing installations with only limited modification.

With continued reference to FIG. 2, the output of motion-compensating subsystem 34 is in the form of separate "forward" and "reverse" actuating commands. For the illustrated application, control unit 36 responds to these commands to drive motor 38 and the lifting mechanism to raise or lower the load at a fixed speed. Motor 38 is thus conditioned to respond to the sense of the accelerometer output with full forward or full reverse operation but with a fixed phase offset as established by compensator subsystem 34.

FIG. 3 shows a detailed block diagram of motion-compensating subsystem 34. The subsystem includes an input analog to digital converter 40, a digital phase detector 44, a summing circuit 46, a band-pass filter 48, a voltage-controlled oscillator 50 and a divider 52 connected in series as illustrated. The output of divider 52 is fed back as a second input to phase detector 44 and as an input to a symmetry adjustment circuit 54. This, in turn, is connected to a positive threshold circuit 56 and a negative threshold circuit 58. A pair of relay coils R1 and R2 are connected to the output of the threshold circuits 56 and 58, respectively. The contacts of relays R1 and R2 are part of motor-control subsystem 36 and will be discussed further in connection with FIG. 5.

Motion-compensating subsystem 34 also includes a phase advance adjustment circuit 60 which is coupled as a second input to summing circuit 46. This provides the desired phase offset between the accelerometer output and the motor actuation outputs of positive and negative threshold circuits 56 and 58.

Figure 4:
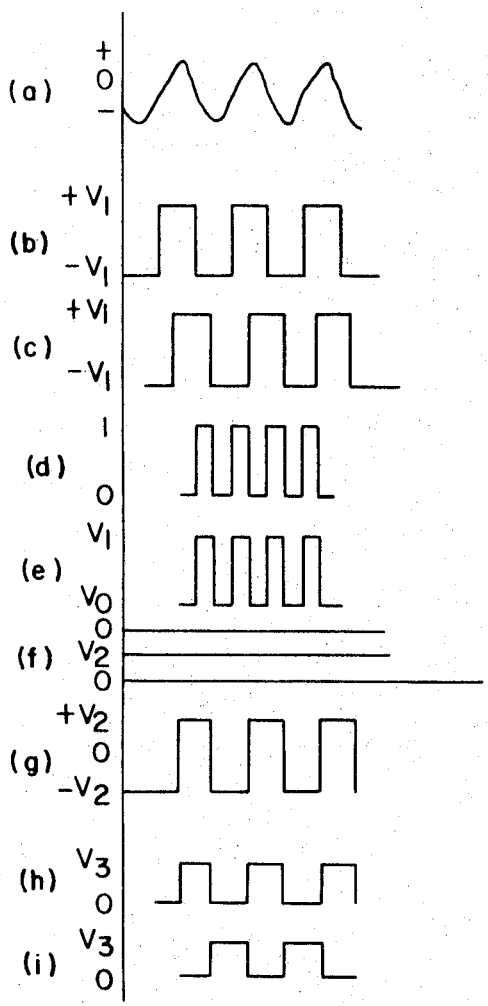
FIG. 4 is a waveform diagram pertinent to the operation of the subsystem of FIG. 3.

Further details of the construction and operation of compensator subsystem 34 may best be understood from consideration of FIGS. 3 and 4, the latter showing waveforms at various points in the circuit of FIG. 3.

The function of analog to digital converter 40 is to transform the continuous signal output of accelerometer 32 into a binary pulse train in phase synchronism with the accelerometer output. Suitable circuits for accomplishing this function include a limiter-amplifier circuit having positive and negative swing, a pair of Schmitt trigger circuits, etc.

A typical representation of the accelerometer output is shown by waveform (a) in FIG. 4; a representation of the desired pulse train is shown by waveform (b). From these, it may be seen that when the accelerometer output is positive, the output of analog to digital converter 40 is at a positive voltage V1. Correspondingly, when the accelerometer output is negative, the output of analog to digital converter 40 is at a negative voltage—V1.

Digital phase detector operates as an error-sensing circuit to compare the phase relationship between the output of analog to digital converter 40 with the subsystem output provided by divider 52. As noted above, the subsystem output is a pulse train in synchronism with the output of accelerometer 32 but having a fixed phase offset. Such a pulse train is illustrated by waveform (c) in FIG. 4. The required error-sensing function is preferably accomplished by an EXCLUSIVE OR circuit, i.e. a binary circuit which provides a high (ONE) output when either, but not both of its inputs are high, and a low (ZERO) output otherwise. Thus, the output of the EXCLUSIVE OR circuit, illustrated at (d) in FIG. 4, is a pulse train in which the pulse width is a measure of the degree of time coincidence between the two input pulse trains (b) and (c) in FIG. 4.

The error pulse train is provided as one input to summing circuit 46 which may be any commercially available, two-input summing amplifier compatible with the remainder of the circuit. The second input for summer 46 is provided by the phase advance adjustment circuit 60. The purpose of this circuit is to introduce a voltage offset Vo for the error pulse train as illustrated at (e) in FIG. 4. Thus, circuit 60 may simply be an adjustable voltage divider connected to the DC operating power for the system. As explained more fully below, the DC voltage offset determines the amount of phase offset to be produced between the input and output of compensator subsystem 34.

The offset error pulse train is processed by low pass filter 48 to provide a DC control signal, the level of which depends on the level of the phase advance adjustment signal and the degree of noncoincidence between the input and output signals as indicated by the pulse width of waveforms (d) and (e) in FIG. 4.

The resulting control signal, shown at (f) in FIG. 4, serves as an input for voltage-controlled oscillator 50. This is preferably a free-running multivibrator having an operating frequency determined by an input bias level. To simplify circuit design, the operating frequency range for oscillator 50 is preferably centered at about 5 kHz. The high-frequency pulse train generated by oscillator 50 is then "down-converted" by divider circuit 52, which may be a conventional counting chain having a sufficient number of counting stages to reduce the oscillator frequency range to that typical of ocean wave disturbances, e.g. about 0.10 Hz. The output of divider circuit 52 is illustrated at (c) in FIG. 4, as previously noted.

The output of divider 52 is coupled to symmetry adjustment network 54. This provides a DC offset to the divider output to eliminate inquality between the positive and negative signal levels as indicated by waveform (g) in FIG. 4. This function is preferably accomplished by a summing circuit having one input divided by the pulse waveform and a second input provided by a DC level through an adjustable voltage divider. Other suitable circuitry may also be employed.

The output of symmetry adjustment network 54 is coupled to positive and negative threshold circuits 56 and 58. Positive threshold circuit 56 is a Schmitt trigger or the like which produces a positive output whenever its input exceeds a minimum threshold value. Similarly, negative threshold 58 may be a Schmitt trigger arranged to provide a positive output whenever its input falls below a minimum negative threshold.

The output of threshold circuits 56 and 58 may be connected through suitable relay driver amplifiers (not shown) to provide actuating current for a pair of relay coils R1 and R2. Contacts of relays R1 and R2 provide the automatic actuating signals for the motor-control subsystem 36, as will now be described in conjunction with FIG. 5.

Figure 5:
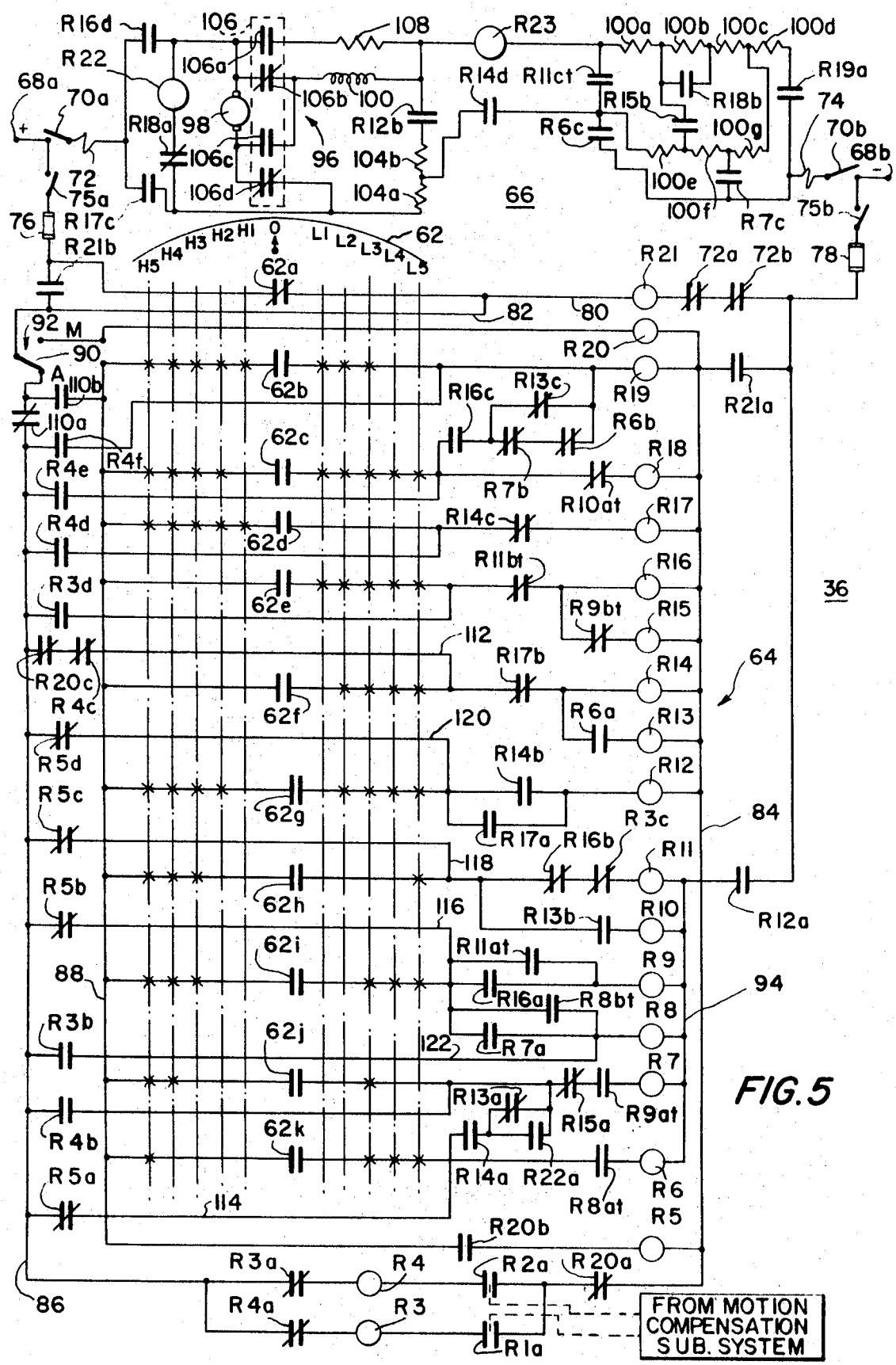
FIG. 5 is a detailed schematic diagram showing a suitable control subsystem for the system of FIG. 2.

Referring to FIG. 5, there is shown a relay control system and the motor circuit for winch 18 illustrated in Fig. 1. For convenience, a conventional detached contact notation is employed in which the relay coils are designated by the letter R and a number (e.g. R1, R2, etc.) and the associated contacts designated by the same notation with an appended letter (e.g. R1a, R2a, etc.). Normally closed contacts are indicated by a slanted line across the contacts. Timed release closing contacts are designated by the suffix $t$ (e.g. R8at, R8bt, etc.).

Motor-control subsystem 36 is actually a combined manual and automatic system. In its manual mode, one of a series of discrete lowering and hoisting speeds or zero speed is selected by proper positioning of a master control switch 62. In the illustrated embodiment, five lowering speeds L1–L5, and five hoisting speeds H1–H5 are provided.

In the automatic mode, with master switch 62 in its rest or zero position, the system operates automatically at the maximum lowering or hoisting speeds (i.e., in the L5 or H5 modes) in response to actuation of relay coils R1 and R2 (see FIG. 3) as hereinafter explained. The operating lever for master switch 62 is provided with a manually operated override switch associated with the handle. The manual override is so constructed that when actuated, a pair of interlocked contact pairs 110a and 110b are respectively opened and closed. As a result positive power is diverted from automatic bus 86 to manual bus 88, and automatic operation ceases. The system operates in a manual mode until the operator releases the override switch and returns the control switch 62 to the rest position. This allows use of the system for maintaining constant cable tension or load position and also for load transfer under fully manual control.

Using the notation referred to above, motor-control subsystem 36 is comprised of a relay control network 64 and a motor circuit 66. Relay network 64 includes relays R3 through R23 having the following functions:

| | |
|---|---|
| R3 | Automatic Mode Lowering Control |
| R4 | Automatic Mode Hoisting Control |
| R5 | Manual Mode Transfer Control |
| R6 | Motor-Speed Control |
| R7 | Motor-Speed Control |
| R8 | Motor-Acceleration Time Control |
| R9 | Motor-Acceleration Time Control |
| R10 | Motor-Acceleration Time Control |
| R11 | Motor-Speed Control |
| R12 | Dynamic Braking Control |
| R13 | Lowering Interlock |
| R14 | Lowering Control |
| R15 | Motor-Speed Control |
| R16 | Lowering Control |
| R17 | Hoisting Control |
| R18 | Motor-Speed Control |
| R19 | Motor-Power Control |
| R20 | Manual Mode Transfer Control |
| R21 | Undervoltage Protector |
| R22 | Lowering Overspeed Protector |
| R23 | Mechanical Brake Actuator |

Power is supplied by any suitable DC generator at positive and negative power supply terminals 68a and 68b respectively. Motor circuit 66 is energized through a pair of main switches 70a and 70b, and through the coils of a pair of overload protection circuit breakers 72 and 74. Power for relay network 64 is provided through a pair of switches 75a and 75b, a pair of safety devices such as fuses 76 and 78 and normally open contact pairs R21a and R21b, the closure of which is controlled by an energizing circuit 80 including overload protection breaker contact pairs 72a and 74a, master switch contact pair 62a or manual bypass lead 82 and undervoltage protector relay R21. As long as sufficient current is provided to maintain relay R21 energized, contacts R21a and R21b are closed. Closure of contact pair R21a energize a negative relay power bus 84, while closure of contact pair R21b energizes automatic mode positive power bus 86 or manual mode positive bus 88, depending on the position of armature 90 of a mode selector switch 92. An auxiliary negative power bus 94 is also provided and is energized through a normally open contact pair R12a of dynamic braking control relay R12 as hereinafter described.

Relay network 64 further includes a series of manual contact pairs 62a–62k under control of master switch 62. These contact pairs complete the proper circuits for motor speed selection in the manual operating mode. Contact pair 62a is closed only when master switch 62 is on its "off" or rest position. Contact pairs 62b–62k are open when switch 62 is in the "off" position but are closed for certain operating positions (H1–H5 or L1–L5) of switch 62.

FIG. 5 includes a diagrammatic legend to indicate the closing pattern for switches 62b–62k. The notation employed to indicate closure of a contact pair is the presence of an X under the L1–L5 and H1–H5 positions of switch 62 on the leads for that contact pair.

Thus, according to this notation, contact pair 62b is closed for all of hoisting speeds H1–H5 and for lowering speeds L1–L3. Contact pair 62f is open for all of hoisting speeds H1–H5 and for lowering speed L1, but is closed for lowering speeds L2–L5.

Motor circuit 66 includes a variable speed heavy-duty DC motor 96 including an armature 98 and a series field 100. Coupled to the motor are a series of speed-control resistors 102a–102g and dynamic braking resistors 104a and 104b. Contact pairs R6c, R7c R11ct, R15b and R18b connect and disconnect various ones of resistors 100a–100g into the motor circuit to determine the motor current in a particular operating mode, and hence the speed during that operating mode. Contact pairs R14d, R16d, R17c, R18a and R19a control the direction of armature current flow, and hence the direction of motor operation for the hoisting and lowering or automatic modes.

Motor circuit 66 contains various customarily provided safety devices. These include multiple contact mechanical payout limit switch 106 having normally closed contacts 106b and 106d, and normally open contacts 106a and 106c. Limit switch 106 operates to prevent excessive payout of cable from the winch drum by shunting the motor through normally open contact pair 106a and a limit resistor 108 which provides sufficient current to pick up brake actuator relay R23. This, in turn, actuates a mechanical brake (not shown) to stop the motor.

Other safety features include overload protection breakers 72 and 74, undervoltage protection relay R21, fuses 76 and 78 previously mentioned, and a lowering overspeed protection relay R22 which operates to reduce motor speed if the same increases excessively during lowering operations.

In addition to the foregoing, mechanical interlocks are provided between certain relays controlling the lowering and hoisting operations as indicated by the dotted lines interconnecting various ones of the relay coils. These include relays R3 and R4, R16 and R17, R17 and R14, R7 and R15, R15 and R6.

Also, a set of manual override contacts 110a and 110b is interconnected with master switch 62. Contact pair 110a is closed for the rest position of switch 62 (automatic operation) while contact pair 110b is closed for all of positions L1–L5 and H1–H5 of master switch 62 (manual operation). This effectively transfers energization from automatic positive power bus 86 to manual positive power bus 88. It may also be noted that manual bypass lead 82 maintains the current path for undervoltage relay R21 when master switch 62 is off—normal, i.e. during the manual operation.

OPERATION—MANUAL MODE L3

In preparing the system for operation, the main switches 70a and 70b and the control switches 75a and 75b are closed, and mode selector switch 92 is placed in the M or manual position. With master switch 62 in the "off" position, current through relay R21 energizes contact pairs R21a and R21b, which in turn energize manual positive power bus 88, and negative power bus 84. Manual mode transfer relay R20 operates, causing contact pairs R20a and R20c to open and contact pair R20b to close. Automatic mode relays R3 and R4 are locked out by open contact pair R20a, while contact pair R20c opens the automatic mode path 112 for relays R13 and R14.

Relay R5 picks up through now closed contact pair R20b, which opens contact pairs R5a–R5d. This opens automatic mode paths 114, 116, 118, and 120 for relays R6 and R7, R8 and R9, R10 and R11, and R12, respectively.

The L3 operating mode is achieved by placement of master switch 62 in the L3 position. Master switch contact pair 62a opens and contact pairs 62b, 62c, 62e, 62f, 62g, 62i, 62j and 62k close. The current paths for relays R21 and R5 remain unchanged, as does that for relay R21 even though master switch contact pair 62a is open, due to bypass path 82.

Relay R18 picks up through master switch contact pair 62c and normally closed contact pair R10at. Contact pair 18a opens, and breaks the circuit for lowering overspeed protection relay R22 which is not employed in the L3 mode. Contact pair 18b closes and shunts resistor 100b in motor circuit 66. This establishes the required motor field resistance for the L3 mode, comprising resistors 100a, 100c, and 100d in series.

Relay R16 picks up through normally closed contact pair R11bt and master switch contact pair 62e, closing contact pairs R16a and R16d. Closure of contact pair R16a completes the circuit for relay R9; however, contact pair R12a is open, and secondary bus 94 is not energized, so relay R9 does not pick up at this time. Closure of contact pair R16d completes the positive side of motor circuit 66.

Relay R14 also picks up at this time through normally closed contact pair R17b and master switch contact pair 62f, closing contact pairs R14b and R14d. Closure of contact pair R14d completes the negative side of the power circuit for motor armature 98.

Relay R12 now picks up through closed contact pair R14b and master switch contact pair 62g, closing contact pair R12a which energizes auxiliary bus 94, opening contact R12b to eliminate a motor field bypass path through dynamic braking resistances 104a and 104b.

Concurrently with relays R14, R16, R18, and R19, relay R15 picks up through contact pairs R9bt and R11bt and master switch contact pair 62e, closing contact pair 15b in motor circuit 66. This places the series combination of resistors 100f and 100g in parallel with resistor 100c through now closed contact pair R18b. The resulting circuit, in series with resistor 100d, provides a common return for resistor 100c in the circuit of field 100 and resistors 100e and 104a in the circuit of armature 98, and thereby establishes a low value of the starting current through motor 96 for a short initial accelerating time period.

With auxiliary bus 94 energized, relay R9 now picks up through the previously prepared circuit path including normally open contact pair R16a and master switch contact pair 62i, causing contact pain R9at to close and contact pair R9bt to open after a predetermined time delay selected to establish the initial motor accelerating time period. At the end of the acceleration period, contact pair R9bt opens, and breaks the circuit for relay R15. This reopens contact pair R15b which removes the parallel connection between motor-speed-control resistor 100c and the series combination of speed-control resistors 100f and 100g.

Return of contact pair R15a to its normally closed position at the end of the acceleration time period and the closure of contact pair R9at closes the operating circuit for relay R7, which now picks up through master switch contact pair 62j, and closes contact pairs R7a and R7c. Closure of contact pair R7c places speed-control resistors 100g and 100d in parallel decreasing the armature resistance.

Closure of contact pair R7a completes the energizing circuit for relay R8 through master switch contact pair 62i, closing contact pair R8at after a time delay. Closure of contact pair R8at completes the energizing circuit for relay R6 through master switch contact pair 62k, closing contact R6c. This completes a shunt circuit for speed-control resistors 100e and 100f, eliminating them from the armature circuit which then includes only dynamic braking resistor 104a. The field current path then includes speed-control resistors 100a and 100c in series with the parallel combination of resistors 100d and 100g. These are the normal operating conditions for the L3 manual mode.

By similar analysis, the operating conditions for the remaining lowering modes L1, L2, L4 and L5, and for the hoisting modes H1–H5 may be derived, but detailed description is omitted in the interest of brevity. It should be noted, however, that motor-speed control is effected by series and parallel interconnection of different combinations of resistors 100 in the field and armature circuits. This is accomplished by actuation of relays R6, R7, R11, R15, R18 and R19 to open and close contact pairs R6c, R7c, R11ct, R15b, R18b and R19a. Motor direction is determined by contact pair R16d which completes the positive side of the armature current path for the L1 through L5 modes and contact pair R17c which completes the positive side of the armature current path in the H1–H5 modes. Contact pair R14d completes the negative side of the motor circuit during lowering modes L2–L5 and also for automatic lowering, now to be described.

AUTOMATIC OPERATION—LOWERING MODE

When the system is to be operated in the automatic mode, selector switch 92 is placed in the A position and master switch 62 maintained in the off or rest position. Switches 70a and 70b and 75a and 75b remain closed to energize the system.

With master switch 62 in the "off" position, relay R21 picks up through master switch contact pair 62a and breaker contacts 72a and 72b. This closes contact pairs R21a and R21b which, in turn, energize automatic mode positive power bus 86 and negative bus 84.

Because manual positive power bus 88 is not energized, relay R20 is not actuated. Consequentially, contact pair R20a is closed which conditions the circuits for automatic mode relays R3 and R4. Contact pair R20b is open which locks out manual-control relay R5. Contact pair R20c closes to condition automatic mode signal path 112 for relays R13 and R14.

With relay R5 locked out, contact pairs R5a–R5d are closed. This conditions automatic mode circuit paths 114, 116, 118 and 120 for relays R6 and R7, R8 and R9, R10 and R11, and R12, respectively.

With reference to FIGS. 3 and 4, assume that the motion-compensating subsystem 34 calls for a downward repositioning of the load. Positive threshold circuit 56 actuates relay R1, which closes contact pair R1a.

Relay R3 picks up through normally closed contact pair R20a, contact pair R1a and normally closed contact pair R4a. Contact pair R3a opens to lock out automatic mode hoist-control relay R4. Contact pair R3b closes to complete a circuit path for relay R8 which picks up when power is provided to auxiliary negative power bus 94 as hereinafter described. In addition, contact pair R3c opens, locking out speed-control relay R11, and contact pair R3d closes. The latter completes the circuit through normally closed contact pair R11bt for relay R16 and through normally closed contact pair R9bt for relay R15.

Relay R16 picks up through normally closed contact pair R11bt and closed contact pair R3d, closing contact pairs R16a and R16d. Closure of contact pair R16a completes the circuit for relay R9. However, contact pair R12a is open and secondary bus 94 is not energized so relay R9 does not pick up at this time. Closure of contact pair R16d completes the positive side of motor circuit 66.

Relay R14 also picks up at this time through normally closed contact pairs R17b and R4c and R20c in signal path 112, opening contact pair R14c and closing contact pairs R14b and R14d. Closure of contact pair R14d completes the negative side of the power circuit for motor armature 98 while opening of contact pair R14c locks out hoist control relay R17.

Relay R12 picks up through closed contact pair R14b and contact pair R5d in signal path 120, closing contact pair R12a, which energizes auxiliary bus 94. Also, contact pair R12b opens to eliminate the motor field bypass path through dynamic braking resistances 104a and 104b.

When auxiliary bus 94 energized, relay R8 picks up through previously closed contact pair R3b and relay R9 picks up through the previously prepared circuit path including normally open contact pair R16a and contact pair R5b in signal path 116. This causes contact pairs R8at, R8bt, and R9at to close, and contact pair R9bt to open after the previously described time delay which establishes the initial motor accelerating time. It should be noted, however, that because the motor circuit has not yet been completed, the relay contact pair configurations characterizing the acceleration time period have no effect on operation in the automatic lowering mode.

At the end of the time delay, closure of contact pair R8at completes the energizing circuit for relay R6 through contact pair R5a and signal path 114, closing contact pair R6c. This completes the negative side of the circuit for motor armature 98 through contact pair R14d and dynamic braking resistor 104a. Also, closure of contact R6c completes the negative side of the power circuit for motor field 100 through resistors 100e, 100f, 100g, 100c, 100e, 100a and the coil of mechanical brake actuator relay R23. These are the normal operating conditions for the automatic lowering mode.

Several additional points should be noted in connection with automatic-lowering operation. Simultaneously with the establishment of motor operation by actuation of relay R6 and closure of contact pair R6c, contact pair R9a closes, conditioning the signal path for relay R7. Also, at the same time, contact pair R9bt opens, breaking the circuit for R15. Contact pair R15b in motor circuit 66 was closed by prior actuation of relay R15, but because the negative side of the motor circuit path was not completed, the effect of closure of contact pair R15b was simply to place resistors 100e and 100a in an unenergized series path with the motor field and motor armature, the circuit being completed by dynamic braking resistor 104, contact pair R14d, and the coil of mechanical brake actuator resistor R23. Contact pair R15b opens simultaneously with the closure of contact pair R6c and thus has no effect on the motor field and armature circuits in the automatic lowering mode.

Release of relay R15 recloses normally closed contact pair R15a which would have the effect of completing a circuit for relay R7 through picked up contact pairs R9a and R14a and normally open contact pairs R13a and R15a. However, actuation of relay R6 closes contact pair R6a which completes the circuit for relay R13 through normally closed contact pair R17b and normally closed contact pairs R20c and R4c in signal path 112. Relay R13 picks up and opens contact pair R13a, thereby breaking the just completed circuit for relay R7 before it can pick up.

Note, however, that an alternative actuating circuit for relay R7 may exist through contact pair R22a. With reference to motor circuit 66, it may be seen that a current path exists for lowering overspeed protector relay R22 through normally closed contact pair R18a. As will be appreciated, the speed of motor 96 is reflected by the voltage across armature 98. Relay R22 is adjusted to pick up when its voltage indicates an undesired overspeed condition. Thus, when the voltage becomes sufficiently high to actuate relay R22, contact pair R22a closes. This completes the actuating circuit for relay R7. Contact pair R7c closes which removes resistors 100e and 100f from the motor field circuit, thereby increasing the field current.

Correspondingly, if the hoisting cable unwinds excessively, limit switch 106 operates, which opens contact pairs 106b and 106d and closes contact pairs 106a and 106c. The resulting current flow through resistor 108 shunts the motor circuit and actuates relay R23 to halt the lowering operation.

AUTOMATIC MODE—HOISTING OPERATION

Assume that with the system in the automatic-lowering mode as described above, the acceleration changes from positive to negative. As soon as compensation subsystem 34 responds, relay R1 is released and relay R2 picks up. This opens contact R1a and closes contact R2a, causing relay R3 to drop out, closing contact pairs R3a and R3c and opening contact pairs R3b and R3d. Closure of contact pair R3a completes the circuit for automatic mode hoisting control relay R4. This picks up, opening contact pairs R4a and R4c and closing contact pairs R4b, R4d, R4e and R4f.

When contact pair R3b opens, signal path 122 for relay R8 is broken, but the relay remains energized through an alternative path formed by holding contact pair R8bt and contact R5b in signal path 116. Contact pairs 8at and 8bt remain closed, with contact pair R8at maintaining relay R6 actuated, and contact pair R8bt continuing to operate as a holding circuit for relay R8. The continued actuation of relay R6 maintains contact pair R6c closed in the negative side of motor circuit 66.

Closure of contact pair R3c conditions a circuit path for relay R11, through contact pair R5c in signal path 118 and contact pair R16b. This circuit is completed when contact pair R16b closes as a result of release of relay R16 by the opening of contact pair R3d.

When relay R16 drops back, contact pair R16a opens, opening the circuit path for relay R9 which drops out. An alternative circuit path for relay R9 exists through contact pair R11at of actuated relay R11, but R11at is a time delay contact pair so contact pair R16a opens before contact pair R11at can close. Therefore relay R9 releases and contact pair 9at opens, which breaks the circuit path for relay R7, preventing it from picking up through contact pairs R4b and R15a.

The release of relay R16 also opens contact pair R16d in motor circuit 66. This breaks the positive side of the motor circuit and places motor field 100 and armature 98 in a series circuit including normally closed limit switch contacts 106b and 106d, dynamic braking resistance 104a, contact R14d, speed-control resistors 100e, 100f, 100g, 100c, 100b and 100a and mechanical brake actuator relay R23. The sudden increase in current through this loop due to the current in armature 98 causes relay R23 to pick up, and actuates the mechanical brake to slow the motor in preparation for direction reversal.

With contact pair R3a closed, automatic mode hoist control relay R4 picks up, opening contact pairs R4a and R4c, and closing contact pairs R4b, R4d, R43 and R4f. Opening of contact pair R4a blocks the circuit for relay R3 as a further precaution against its operation during the hoisting mode.

The opening of contact pair R4c breaks signal path 112 and releases relays R13 and R14. A circuit is thus completed for relay R17 through contact pair R14c and contact pair R4d which closes at this time. Closure of contact pair R4f actuates R19 which closes contact pair R19a at the negative end of the actuating circuit for motor field 100.

Release of relay R13 opens contact pair R13b and relay R10 drops out. Contact pair R10at returns to its normally closed position, and relay R18 is energized, the circuit path being completed through contact pair R10at and previously closed contact pair R4e. Contact pair 18a opens to deactivate lowering overspeed protector relay R22 in motor circuit 66 which is unneeded during the hoisting operation. Also, contact pair R18b closes, shunting speed-control resistor 100b to eliminate it from the circuit of motor field 100.

As mentioned above, release of relay R14 closes contact pair R14c and actuating relay R17 through contact pair R4d. Contact pair R14b opens and releases relay R12, but actuation of relay R17 closes contact pair R17a immediately completing a new circuit for relay R12. Any momentary deenergization of auxiliary negative power bus 94 does not affect circuit operation.

Release of relay R14 also opens contact pair R14d which breaks the negative current path for motor field 98 through dynamic braking resistance R104a. Since contact pair R17c picks up at this time, armature 98 is connected to the positive end of the power supply through contact pair 106d, R17c, breaker 72, and power switch 70a. Armature current flow is thus reversed, and motor 96 begins to accelerate in the opposite direction, the circuit being completed through field 100, mechanical braking relay R23 and through an acceleration resistance circuit comprising resistors 100a and 100c in series with the parallel combination of resistor 100d with resistors 100e, 100f, and 100g in series.

At the end of the contact pickup delay period for relay R11, contact pair R11at closes, completing the circuit path for relay R9, which picks up through contact pair R5b in signal path 116, and contact pair R11at. Contact pair R11at also closes and shunts the entire acceleration resistance circuit thereby directly connecting field 100 and armature 98 across the power supply. These are the operating conditions for the automatic hoisting mode.

By an analysis comparable to the foregoing, the contact operating sequence for transfer between the automatic hoisting and automatic lowering modes may be derived, but detailed description is omitted in the interest of brevity.

However, it should be understood that in the automatic operation, transfer between the hoisting and lowering modes will take place every half cycle of motion being compensated for. At each such transition substantial time is required for motor reversal from maximum speed in one direction to maximum speed in the other direction. A 500 hp. motor, for example, and a relay motor-control system of the type described above, typically would have a reversal time of about 3 to 4 seconds, i.e., on the order of about 50 percent of the period of typical ocean wave disturbances. From this, it will readily be appreciated why manual compensation would be difficult, if not impossible.

Moreover, since the dynamic characteristics vary from system to system, it will be appreciated that for use of the present motion-compensation subsystem with existing motor systems, a wide range of phase adjustment must be possible. The phase offset adjustment capability of 4 to 6 seconds is found to be quite satisfactory.

As a practical matter, a good first approximation to the phase advance required in a given situation may be obtained simply by measuring the transition time between steady state operation of the system in the L1 and H5 modes, i.e., the time to convert from maximum speed in the lowering direction to maximum speed in the hoisting direction, and setting the phase offset to approximately this value. The phase offset may then be adjusted for optimum system response.

As pointed above, the application described in connection with Fig. 1 is intended to be exemplary of one of several applications of this invention. Another application is illustrated in FIG. 6. Here, the required task is transfer of a load between two vessels 130 and 132. A crane 134 (like crane 14 shown in FIG. 1) is provided on vessel 132 and includes a boom 135, control unit 136 and a motor-operated winch 138 supporting a lift cable 139. A motion-sensing device 140 is positioned on vessel 130, and a second sensing device 142 is mounted at the end of boom 135.

Motion sensors 140 and 142 are preferably accelerometers mounted with sensing axes positioned in the direction of the motion being eliminated. Sensor 142 may be mounted either at the tip of boom 135 as illustrated, or may be a load cell at the lower end of hoisting cable 139.

Figure 7:
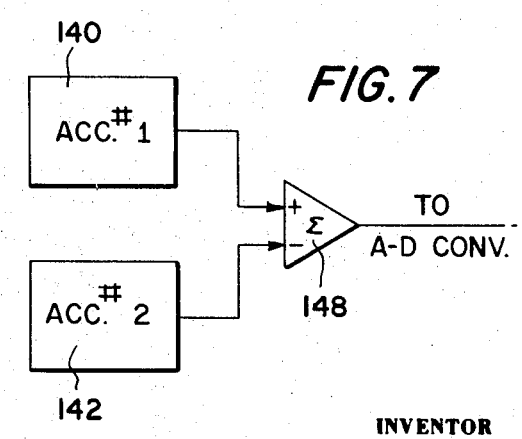
FIG. 7 is a fragmentary block diagram showing modification of a portion of the system for use in the application of FIG. 6.

FIG. 7 shows in block diagram form, the manner in which the signals from accelerometers 140 and 142 are combined to provide a reading of the relative motion between vessels 130 and 132. As illustrated, the outputs of accelerometers 140 and 142 are connected to a summing amplifier 148 which provides the difference between the two acceleration signals. The output of summing amplifier 148 is connected as the input to the digital converter 40 shown in FIG. 3. No other modification of motion-compensating subsystem 34 would be necessary.

In addition to the above-described load-transfer applications, the motion-compensating system here described has general utility for any application requiring constant tension in a cable connecting two bodies. For example, if a cable is to be connected generally horizontally between two vessels, the system of this invention may be employed to payout and haul in the cable in response to the relative horizontal motion including the horizontal components of the roll and yaw, and also in response to cable-stretching effects of vertical motion. For such an application, the most suitable sensor would be a load cell in the cable itself.

The invention may be embodied in other specific forms without departing from the spirit or essential characteristics thereof. The present embodiments are intended to be considered in all respects as illustrative and not restrictive, the scope of the invention being indicated by the appended claims rather than by the foregoing description, and all changes which come within the meaning in range of equivalency of the claims are intended to be embraced therein.

What is claimed and desired to be secured by U.S. Letters Patent is:

1. A method of maintaining constant tension in a linking mechanism connecting two bodies subject to an essentially repetitive relative motion comprising the steps of: connecting said linking mechanism to a reversible takeup mechanism having a steady state reversal timelag which is a function of its physical parameters, deriving a signal analog of said relative motion, generating a control signal in synchronism with said signal analog but at a predetermined phase advance in relation thereto, said phase advance being a function of said takeup mechanism reversal timelag, and operating said takeup mechanism in response to said control signal.

2. The method as defined by claim 1 wherein said phase advance is approximately equal to the reversal timelag of said takeup mechanism.

3. The method as set forth in claim 1 wherein said signal analog of said relative motion is determined by measuring the tension in said linking mechanism.

4. The method as set forth in claim 1 wherein said signal analog is derived by measuring the motion in a predetermined direction of one of said bodies.

5. The method as set forth in claim 1 wherein said signal analog is derived by measuring the difference between the actual motions in a given direction of said two bodies.

6. The method as set forth in claim 1 wherein said step of generating said control signal comprises converting said signal analog to a first binary signal having a first value when said analog is positive with respect to some reference and a second value when said analog is negative with respect to said reference; generating a second binary signal having approximately the same repetition rate as said first binary signal; comparing said first and second binary signals to determine the degree of noncoincidence therebetween; and adjusting the repetition rate of said second binary signal so that the degree of noncoincidence between said first and second binary signals represents said predetermined phase advance.

7. The method of claim 6 wherein said takeup mechanism is operated in one direction when said control signal has its first value, and in the other direction when said control signal has its second value.

8. The method as set forth in claim 1 wherein said signal analog has positive and negative values with respect to some reference corresponding to opposite directions of relative motion, and wherein said takeup mechanism is operated in one direction in response to positive values of said signal analog, and in the other direction in response to negative values of said signal analog.

9. The method as set forth in claim 8 wherein said takeup mechanism is operated at the same speed in both directions.

10. The method as defined by claim 1 wherein said signal analog is derived by measuring the acceleration of at least one of said bodies.

11. Apparatus for maintaining constant tension in a linking mechanism connecting two bodies subject to an essentially repetitive relative motion comprising: means for sensing said relative motion and for generating a continuous signal analog thereof; means responsive to said signal analog for generating a control signal in synchronism therewith but having a fixed phase advance in relation thereto; reversible drive means adapted to be coupled to said linking mechanism for controlling the tension therein, said drive means being characterized by a steady state reversal time which is a function of its physical parameters; and control means responsive to said control signal to operate said drive means in one or the other direction in accordance with changes in said relative motion.

12. Apparatus as defined in claim 11 wherein the value of said phase advance is a function of the reversal time of said drive means.

13. Apparatus as defined in claim 11 wherein said phase advance is approximately equal to said reversal time.

14. Apparatus as defined in claim 11 wherein said sensing means is an accelerometer.

15. Apparatus as defined in claim 11 wherein said sensing means comprises a motion pickup coupled to each body, and means coupled to said pickups to generate a signal representing the difference between the outputs of said pickups.

16. Apparatus as defined in claim 15 wherein said pickups are accelerometers.

17. Apparatus as defined in claim 11 wherein said signal analog represents the acceleration of said relative motion.

18. Apparatus as defined in claim 11 wherein said sensing means comprises a load cell coupled into said linking mechanism.

19. Apparatus as defined in claim 11 wherein said means for generating said control signal comprises means responsive to said signal analog to generate a first binary signal having one value when said analog is positive relative to some reference and a second value when said analog signal is negative relative to said reference; oscillator means for generating a second binary signal having approximately the same repetition rate as said first binary signals; means for comparing said first and second binary signals to generate an error signal representative of the degree of noncoincidence between said first and second signal; correction signal generating means for adding to said error signal a compensation signal representing a predetermined degree of noncoincidence between said first and second signals and means for coupling said correction signal to said oscillator means to control the repetition rate of said second binary signal.

20. Apparatus as defined in claim 19 further including means responsive to said second binary signal to operate said second binary signal to operate said device means in one direction when said binary signal has one value and in the other direction when said binary signal has its other value.

* * * * *

UNITED STATES PATENT OFFICE
CERTIFICATE OF CORRECTION

Patent No. 3,624,783　　　　　　　　　　Dated November 30, 1971

Inventor(s)　Nuke Ming Chang

It is certified that error appears in the above-identified patent and that said Letters Patent are hereby corrected as shown below:

In Column 2, line 7, "changes in direction" should read --changes direction--.

In Column 5, line 6, "divided" should read --provided--; in lines 71 and 72, "R18
　　　　　Motor-Speed Control"
should read --R18　Motor-Speed Control-- all in the same line.

In Column 6, line 46, "R7c" should read --R7c,--.

Signed and sealed this 18th day of July 1972.

(SEAL)
Attest:

EDWARD M. FLETCHER, JR.　　　　ROBERT GOTTSCHALK
Attesting Officer　　　　　　　　Commissioner of Patents